(12) United States Patent
Peterson et al.

(10) Patent No.: US 7,496,784 B1
(45) Date of Patent: Feb. 24, 2009

(54) METHOD AND SYSTEM FOR THRESHOLDING HARDWARE ERRORS

(75) Inventors: Beth Ann Peterson, Tucson, AZ (US);
Todd C. Sorenson, Tucson, AZ (US);
Matthew Joseph Kalos, Tucson, AZ (US); Ashwani Kumar, Tucson, AZ (US); James Lamar Hood, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/971,911

(22) Filed: Jan. 10, 2008

(51) Int. Cl.
*G06F 11/00* (2006.01)
(52) U.S. Cl. .................. 714/5; 714/13; 714/25; 714/48
(58) Field of Classification Search .......... 714/5, 714/13
See application file for complete search history.

(56) References Cited

U.S. PATENT DOCUMENTS

| | | |
|---|---|---|
| 5,161,156 A | 11/1992 | Baum et al. |
| 5,753,902 A | 5/1998 | Fujioka |
| 5,867,732 A | 2/1999 | Young |
| 6,198,705 B1 | 3/2001 | Tran et al. |
| 6,519,717 B1 | 2/2003 | Williams et al. |
| 2004/0194001 A1 | 9/2004 | Ting et al. |
| 2005/0060611 A1* | 3/2005 | Benhase et al. ............... 714/25 |
| 2005/0188279 A1* | 8/2005 | Gibble et al. .................. 714/42 |
| 2006/0104209 A1* | 5/2006 | De Araujo et al. ........... 370/242 |
| 2006/0248245 A1* | 11/2006 | Ninomiya et al. .............. 710/68 |

\* cited by examiner

*Primary Examiner*—Emerson C Puente
(74) *Attorney, Agent, or Firm*—MaxValue IP, LLC

(57) ABSTRACT

A method is provided to protect against ill-behaved microcode by balancing between an actual occurrence of a hardware problem and a microcode bug setting a flag appearing as a hardware problem. In this method, the error recovery is performed only on a single piece of hardware and no further error recovery action is taken on other pieces of similar hardware. The approach addresses the problem by treating a hit on one card as a hardware problem, but as a bug on subsequent cards. The invention keeps track of whether or not the same event has occurred on the same type of hardware so not to take action on more than one instance of the hardware. Subsequent hits on another instance of the hardware will not trigger the hardware related recovery on additional hardware.

1 Claim, 2 Drawing Sheets

Storage system A

US 7,496,784 B1

METHOD AND SYSTEM FOR THRESHOLDING HARDWARE ERRORS

BACKGROUND OF THE INVENTION

After a piece of computer hardware, such as a memory device is developed, it undergoes a testing phase to identify all possible errors followed by their debugging. In a cluster, for instance, where multiple identical units of hardware are used, the hardware errors need to be analyzed in every single piece of the hardware, for instance, all of the host adapter cards.

When a hardware error flag, such as Header Longitudinal Redundancy Check (or Header LRC check) is raised, the hardware goes through a delayed reset. If multiple host adapter cards are diagnosed with errors, the system delay time is increased due to multiple hardware resets. Most of the time, on the other hand, the indicated hardware errors are due to errors in the microcode and the data in the system cache is correct. The microcode error can raise the same type of hardware error flag in most of the host adapter cards, indistinguishable from a true hardware error. Therefore, each indicated error takes down host adapter cards one after another, and finally lead to the failure of I/O and loss of access.

A true hardware error can be related to problems with tracks on the drive, in cache or the host adapter cards. Hardware errors are not unexpected but numerous occurrence of similar hardware errors on different pieces of similar hardware are unexpected and can be attributed to a microcode error. In this case, it is desired not to continue taking any more recovery actions on the hardware. The general ability to drive I/O is affected by the success in error recovery when problems occur on the I/O processing hardware. Too general a granularity in thresholding errors can result in a loss of access to hardware.

SUMMARY OF THE INVENTION

A method is provided for thresholding hardware errors in a storage system. In one embodiment of the method, wherein the storage system comprises multiple host adapter cards, and wherein the multiple host adapter cards connect to a storaae control unit; the method comprises the steps of receiving a string of bits on a longitudinal track, generating a parity bit from the string of bits on the longitudinal track to form a longitudinal-redundancy check, wherein the multiple host adapter cards are configured in a cluster. In case of a problem with the system, then raising a first flat in a header for the longitudinal-redundancy check, fencing off a first card corresponding to the first flag among the multiple host adapter cards for a first job, reissuing the first job to a second card among the multiple host adapter cards, and marking all of the multiple host adapter cards other than the first card with a marker, so that all of the multiple host adapter cards other than the first card are not allowed to be fenced off in case of a new adapter card is put in service, starting an initial microcode load operation, and checking to see if the marker is set, preventing an error recovery after a predetermined number of error hits occurs based on longitudinal redundancy checks within a predetermined period of time.

DETAILED DESCRIPTION OF THE PREFERRED EMBODIMENTS

Figure 1:
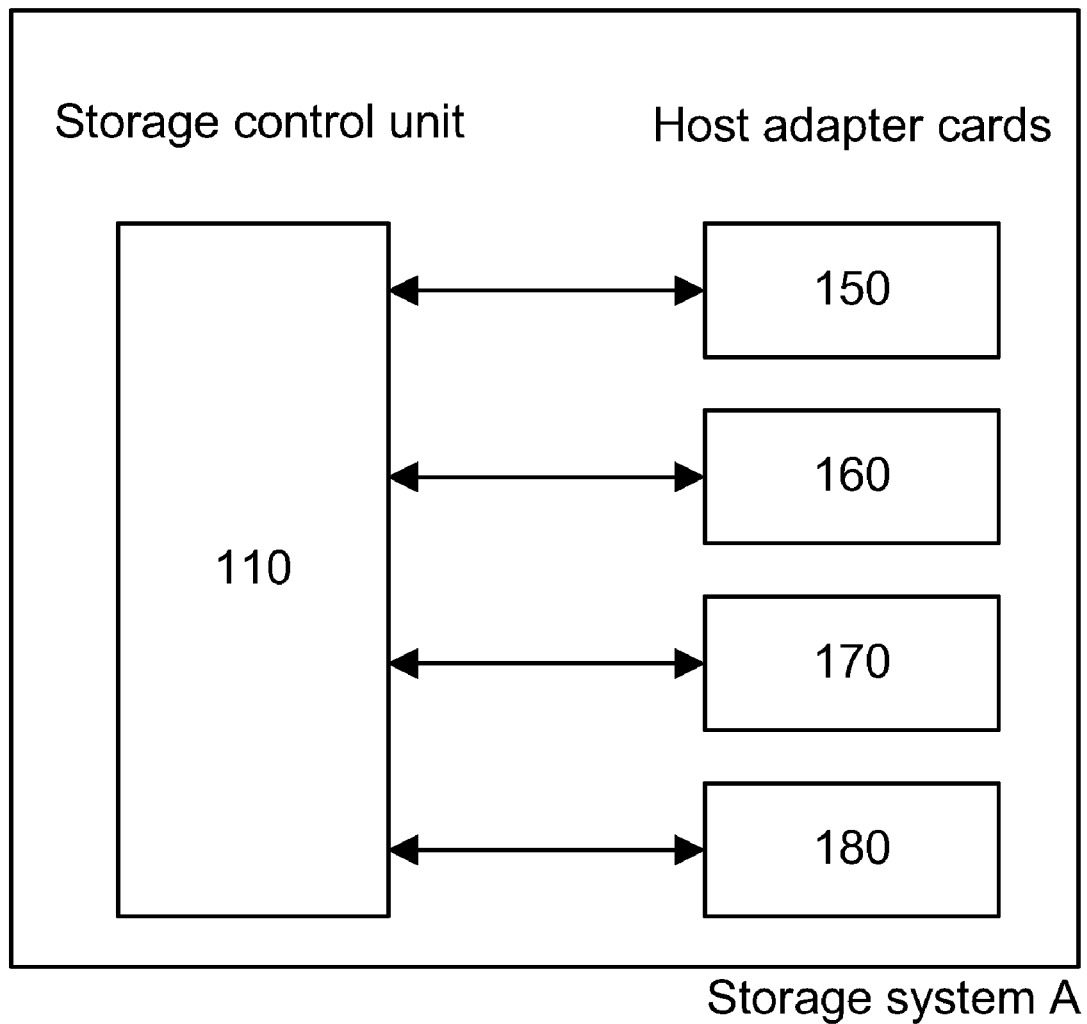
FIG. 1 illustrates a storage system comprising a storage control unit and multiple host adapter cards.
Figure 2:
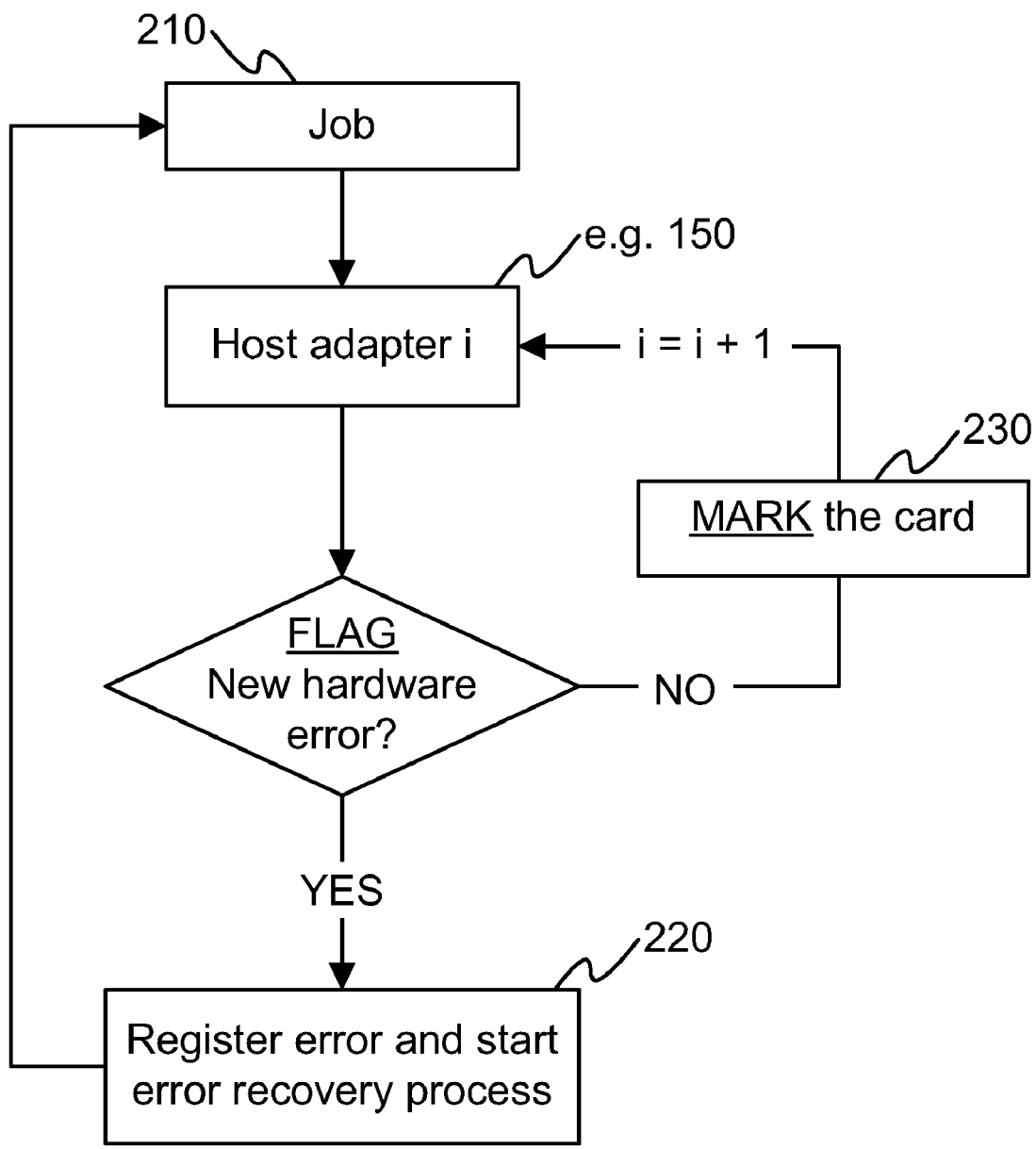
FIG. 2 shows a process flow diagram for an example of error flag treatment as explained in the present invention.

A repeating microcode error can cause a hardware type error flag (e.g., Header LRC check) on the host adapter cards (e.g., DS8000 Storage Control Unit), while the data in cache seems fine. The flag will incorrectly indicate the host adapter hardware as having a problem, causing the card to go through delayed reset. LRC stands for Longitudinal Redundancy Check and is an error detection and checking method used to verify the accuracy of stored or transmitted data. LRC works by generating a parity bit from a specified string of bits on a longitudinal track.

When the job is reissued down another path to another card, the same microcode bug can again flag another Header LRC check, incorrectly indicating a problem with the card, followed by another delayed reset on a different host adapter card. This issue may continue taking away enough host adapter cards, until I/O can no longer function and there will be a loss of access.

Because a Header LRC check is considered as the result of a hardware problem and not that of a microcode problem, each occurrence is treated as being hardware related, instead of factoring in a different recovery approach due to the possibility of a microcode issue. A hardware error could be due to a problem with the track on the drive, in cache or the host adapter card. Nevertheless, if the Header LRC check is the result of a microcode bug, then it is desired not to continue taking recovery actions on the hardware.

The general ability to drive I/O is affected by the success in error recovery when problems occur on the I/O processing hardware. Too general a granularity in thresholding errors can result in a loss of access to hardware.

A single hardware related error is not wholly unexpected, but multiple hardware errors on different pieces of like-hardware are unexpected. A method is provided to protect against ill-behaved microcode by balancing between an actual occurrence of a hardware problem and a microcode bug setting a flag appearing as a hardware problem. The invention keeps track of whether or not the same event (flag) has occurred on the same sort of hardware so not to take action on more than one instance of the hardware.

In this method, the error recovery (delayed reset on a single host adapter card) is performed only on a single piece of hardware and no further error recovery action is taken on other pieces of hardware (delayed resets on any additional cards which may result in loss of access). The approach addresses the problem by treating a hit on one card as a hardware problem (recovery actions), but as a bug on subsequent cards (no recovery actions).

The invention modifies the current error recovery algorithms to perform only the hardware-related recovery on the first instance of the problem. Subsequent hits on another instance of the hardware will not trigger the hardware related recovery on additional hardware.

In one embodiment, the Error Recovery code will fence the host adapter on the first occurrence, as long as no other host adapter card has already been fenced for the same reason. Once an adapter is fenced for this reason, a mark on the "wall" will be set. This mark will be shared between clusters if there is a dual cluster operational state, and the mark is reset to FALSE during Initial Microcode Load operation (IML), i.e. restart using an IML. The mark on the "wall" will include the adapter-ID of the adapter. When the adapter that was fenced is put into service mode, the flag will be cleared.

In another embodiment, the error recovery is limited by thresholding after a particular number of error hits. In another embodiment, the error recovery is limited by thresholding to the hits within a particular period of time.

The invention is for a Storage Control Unit, but the usage can be expanded to provide correct error recovery thresholding for any system with redundant hardware that processes I/O or perform other work that would be impacted by the hardware's availability.

Header LRC check is a flag that normally appears as indication of a hardware problem with host adapter cards (e.g., DS8000 Storage Control Unit). The normal response to its occurrence is to put the card through a delayed reset. When multiple adapter cards are configured in a cluster, the first adapter card experiencing the flag is fenced off, and the job is reissued down another path to another card.

However, the same flag may be set by a bug in a microcode instead of being a hardware problem. As the result, the occurrences of such repeating bug will take out one adapter card after another, rendering the I/O impossible and the hardware inaccessible.

One embodiment of this invention is about a method to limit the fencing only to the first adapter card when the flag is encountered. It then prevents fencing of other adapter cards if the same flag reoccurs. The method marks the occurrence with the adapter ID on which the first flag appeared, so that when the fenced adapter is put back in service, the mark is cleared during the IML (i.e. restart using an Initial Microcode Load operation).

Herein, a method of thresholding hardware errors in a storage system (A in FIG. 1) is presented. In this embodiment, the hardware comprises multiple host adapter cards (e.g. 150), which connect to a storage control unit (110). The method comprises the steps of receiving a string of bits on a longitudinal track and generating a parity bit from the string of bits on the longitudinal track, to form a longitudinal-redundancy check.

The multiple host adapter cards (e.g. 150) are configured in a cluster. In case of a problem with the hardware (150), a first flag is raised in a header for the longitudinal-redundancy check (220), the first flag is fenced off for a first card among the multiple host adapter cards for a first job (210), the first job (210) is reissued to a second card (160 shown in FIG. 1) among the multiple host adapter cards, and all of the multiple host adapter cards other than the first card are marked with a marker (230), so that all of the multiple host adapter cards other than the first card are not allowed to be fenced off.

In case a new adapter card is put in service, an initial microcode load operation is started, and it is checked to see if the marker is set.

The error recovery is limited after a predetermined number of error hits occurs; and is also limited to all of the flags for the longitudinal-redundancy check which occur within a predetermined period of time.

More features in this embodiment include having a flag indicating a hardware problem on each adapter, getting an occurrence of flag on an adapter card, and checking to see if there is a prior occurrence marked with the same flag. If not, marking this occurrence with the adapter ID, fencing the adapter where flag occurred, and reissuing the job down another path to second card; and if yes, simply clearing the flag on the adapter card. When IML occurs (i.e. an adapter is put in service), it is checked to see if a mark is set and whether the mark is associated with the adapter ID of the adapter being put in service, or not. If both conditions are true, the mark is reset.

Any variations of the above teaching are also intended to be covered by this patent application.

The invention claimed is:

1. A method of thresholding hardware errors in a storage system, wherein said storage system comprising multiple host adapter cards, wherein said multiple host adapter cards connect to a storage control unit; said method comprising the steps of:

receiving a string of bits on a longitudinal track;

generating a parity bit from said string of bits on said longitudinal track, to form a longitudinal-redundancy check;

wherein said multiple host adapter cards are configured in a cluster;

in case of a problem with said storage system:

(a) raising a first flag in a header for said longitudinal-redundancy check;

(b) fencing off a first card corresponding to said first flag among said multiple host adapter cards for a first job;

(c) reissuing said first job to a second card among said multiple host adapter cards; and (d) marking all of said multiple host adapter cards other than said first card with a marker, so that all of said said multiple host adapter cards other than said first card are not allowed to be fenced off;

in case of a new adapter card is put in service, starting an initial microcode load operation, and checking to see if said marker is set;

limiting an error recovery, after a predetermined number of error hits occurs; and preventing an error recovery after a predetermined number of error hits occurs based on longitudinal redundancy checks within a predetermined period of time.

* * * * *